(12) United States Patent
Sumi et al.

(10) Patent No.: US 7,511,918 B2
(45) Date of Patent: Mar. 31, 2009

(54) SPINDLE MOTOR AND RECORDING DISK DRIVING APPARATUS HAVING THE SPINDLE MOTOR

(75) Inventors: Shigeharu Sumi, Kyoto (JP); Takeshi Ohiro, Kyoto (JP)

(73) Assignee: Nidec Corporation, Kyoto (JP)

( * ) Notice: Subject to any disclaimer, the term of this patent is extended or adjusted under 35 U.S.C. 154(b) by 324 days.

(21) Appl. No.: 11/277,618

(22) Filed: Mar. 28, 2006

(65) Prior Publication Data

US 2006/0215312 A1 Sep. 28, 2006

(30) Foreign Application Priority Data

Mar. 28, 2005 (JP) ............... 2005-092156

(51) Int. Cl.
*G11B 17/08* (2006.01)
*H02K 11/00* (2006.01)
(52) U.S. Cl. .................. 360/99.08; 310/67 R
(58) Field of Classification Search ............. 360/99.08, 360/98.07, 99.04, 99.11; 310/67 R, 45, 90, 310/216
See application file for complete search history.

(56) References Cited

U.S. PATENT DOCUMENTS

| 4,623,944 | A |   | 11/1986 | Yamashita |
| 4,701,653 | A |   | 10/1987 | Merkle et al. |
| 4,902,941 | A |   | 2/1990  | Merkle et al. |
| 5,251,081 | A |   | 10/1993 | Cossette et al. |
| 5,659,445 | A | * | 8/1997  | Yoshida et al. ........... 360/98.07 |
| 5,763,967 | A | * | 6/1998  | Kurosawa et al. ............. 310/45 |
| 5,825,586 | A | * | 10/1998 | Teshima .................. 360/99.04 |
| 5,844,748 | A |   | 12/1998 | Dunfield et al. |
| 5,965,966 | A |   | 10/1999 | Aiello et al. |
| 6,219,199 | B1|   | 4/2001  | Sakuragi et al. |
| 6,512,654 | B2|   | 1/2003  | Teshima |
| 6,600,632 | B1|   | 7/2003  | Prochazka et al. |
| 6,844,642 | B2|   | 1/2005  | Tashiro |
| 6,940,193 | B2| * | 9/2005  | Hoffmann et al. ......... 310/67 R |
| 6,980,394 | B2|   | 12/2005 | Inoue et al. |
| 7,023,116 | B2| * | 4/2006  | Kuribara ...................... 310/90 |
| 2002/0071204 | A1 | * | 6/2002 | Nii et al. .................. 360/98.07 |
| 2004/0061404 | A1 | * | 4/2004 | Fujii et al. .................. 310/216 |
| 2005/0286167 | A1 |   | 12/2005 | Yonei et al. |
| 2006/0176611 | A1 | * | 8/2006 | Flores et al. ............. 360/99.08 |

FOREIGN PATENT DOCUMENTS

| JP | 05-242589 | 9/1993 |
| JP | 07-253165 | 10/1995 |
| JP | H09-126240 A | 5/1997 |

(Continued)

*Primary Examiner*—Tianjie Chen
(74) *Attorney, Agent, or Firm*—Volentine & Whitt, PLLC

(57) ABSTRACT

Spindle motor capable of positively fixing and securing conduction between a housing and a bracket, and a recording disk driving apparatus using the spindle motor. The bracket has a circular through hole, and the housing is fixedly inserted in the circular through hole. A protrusion is formed on at least one of the bracket and the housing. A conductive member is between and in contact with a flange and the bracket or the housing in the direction of the rotary axis to electrically connect the flange and the bracket or the housing. The conductive member is in contact with the flange and the bracket or the housing under an elastic stress.

19 Claims, 8 Drawing Sheets

FOREIGN PATENT DOCUMENTS

| | | |
|---|---|---|
| JP | 2705384 | 10/1997 |
| JP | 10-083621 | 3/1998 |
| JP | 11-053826 | 2/1999 |
| JP | 2001-231214 | 8/2001 |
| JP | 2002-044900 | 2/2002 |
| JP | 2003-162890 | 6/2003 |
| JP | 2003-314534 A | 11/2003 |

* cited by examiner

SPINDLE MOTOR AND RECORDING DISK DRIVING APPARATUS HAVING THE SPINDLE MOTOR

BACKGROUND OF THE INVENTION

1. Technical Field

This invention relates to a spindle motor having the conduction function and a recording disk driving apparatus having the spindle motor.

2. Description of the Related Art

With the recent increase in the recording density and improvement of the performance of the information storage device, the recording disk driving apparatus has been more and more reduced in size and increased more and more in rotational speed, while the field of application has widened even to the operation in an adverse environment under harsh temperature conditions.

The spindle motor for rotationally driving the recording disk such a magnetic disk includes a rotor assembly having a shaft and a stationary assembly with a sleeve fixed thereon. The shaft is arranged on the inner periphery of the sleeve, and a rotor hub for mounting the recording disk is fixed at the upper end of the shaft. The sleeve is fixed on the inner periphery of a housing, and rotatably supports the shaft through a fluid dynamic bearing. Also, the housing is fixed by such means as an adhesive on a bracket or the like.

The recording disk driving apparatus using the spindle motor includes a magnetic head for reading the data from the recording disk or writing the data in the recording disk.

The spindle motor used for the recording disk driving apparatus described above poses the problem of static electricity described below. Specifically, once the spindle motor is driven and the recording disk is rotated at high speed, friction occurs between the recording disk and the air, with the result that the recording disk is charged by static electricity, thereby causing a potential difference between the recording disk and the bracket. This in turn generates a potential difference between the recording disk and the magnetic head, and electric discharge is caused between the recording disk and the magnetic head, thereby often breaking the magnetic head.

Especially, the recently developed magnetic head of the recording disk driving apparatus, due to the increased capacity and high density of the recording disk, employs a magnetic head of magneto-resistance effect type (MR magnetic head or GMR magnetic head, for example). The MR magnetic head and the GMR magnetic head structurally include an element having a high current density and are mainly formed of a thin film. Without some preventive structure against the potential difference, therefore, breakage may result.

To obviate this problem, a conduction structure for connecting the rotor assembly and the stationary assembly electrically to each other is required to be interposed between the rotor assembly and the stationary assembly. In the prior art, the conduction structure described below has been proposed.

In the structure with the rotor assembly supported on the stationary assembly through the fluid dynamic bearing, for example, the electrical conduction can be secured between the rotor assembly and the stationary assembly by attaching conductivity to a lubricating fluid. Further, the housing and the bracket can be set to an equal potential by using a conductive adhesive for fixing the housing constituting the stationary assembly and the bracket to each other. As an alternative, a part of the bonded portion between the housing and the bracket is plastically deformed and coupled by metal to secure the conduction.

In the prior art, however, the housing and the bracket are often formed of different types of material having different coefficients of thermal expansion. Also, the coefficient of thermal expansion of the conductive adhesive is often different from those of the housing and the bracket. Depending on the temperature of the operating environment, therefore, the bonded joint may develop an excessive thermal stress causing a cracking or separation.

In such a case, the rotation of the rotor assembly of the spindle motor transmits the vibration, etc. of the rotor assembly to the sleeve through the fluid dynamic bearing, then from the sleeve to the housing, and is applied to the conductive adhesive for fixing the housing and the bracket to each other. Unless a sufficient amount of the conductive adhesive is coated between the housing and the bracket, therefore, the vibration stress and the thermal stress, etc. due to the temperature of the operating environment causes the cracking or separation of the conductive adhesive, which may be aggravated gradually. Once this phenomenon occurs in the conductive adhesive, the electrical conduction between the housing and the bracket is adversely affected.

Also, many conductive adhesives use silver as a main component and therefore, are high in price. By minimizing the amount of the conductive adhesive used as possible, therefore, the cost saving is often attempted. An excessively small amount of the conductive adhesive, however, would adversely affect the conduction between the housing and the bracket.

BRIEF SUMMARY OF THE INVENTION

This invention has been achieved in view of the problem described above, and the object thereof is to provide a spindle motor and a recording disk driving apparatus having the spindle motor in which the housing and the bracket can be fixed positively and accurately, while at the same time securing electrical conduction.

According to a preferred embodiment, the spindle motor according to this invention is so configured that a conductive member elastically deformed along the rotation axis is strongly kept in contact with the bracket or the housing through a protrusion formed on the bracket or the housing. In view of the fact that the bracket and the housing are strongly held while maintaining the elastic deformation of the conductive member, the electrical conduction between the bracket and the housing can be positively secured against a temperature change or a shock.

According to another preferred embodiment, the recording disk driving apparatus according to the invention uses the spindle motor according to the invention, and therefore the static electricity can be released always stably outside of the spindle motor without regard to the temperature of the environment in which the recording disk driving apparatus is used. In this way, a reliable and durable recording disk driving apparatus can be provided.

The above and other objects, features and advantages will be made apparent by the detailed description taken in conjunction with the accompanying drawings.

DETAILED DESCRIPTION OF THE INVENTION

Figure 1:
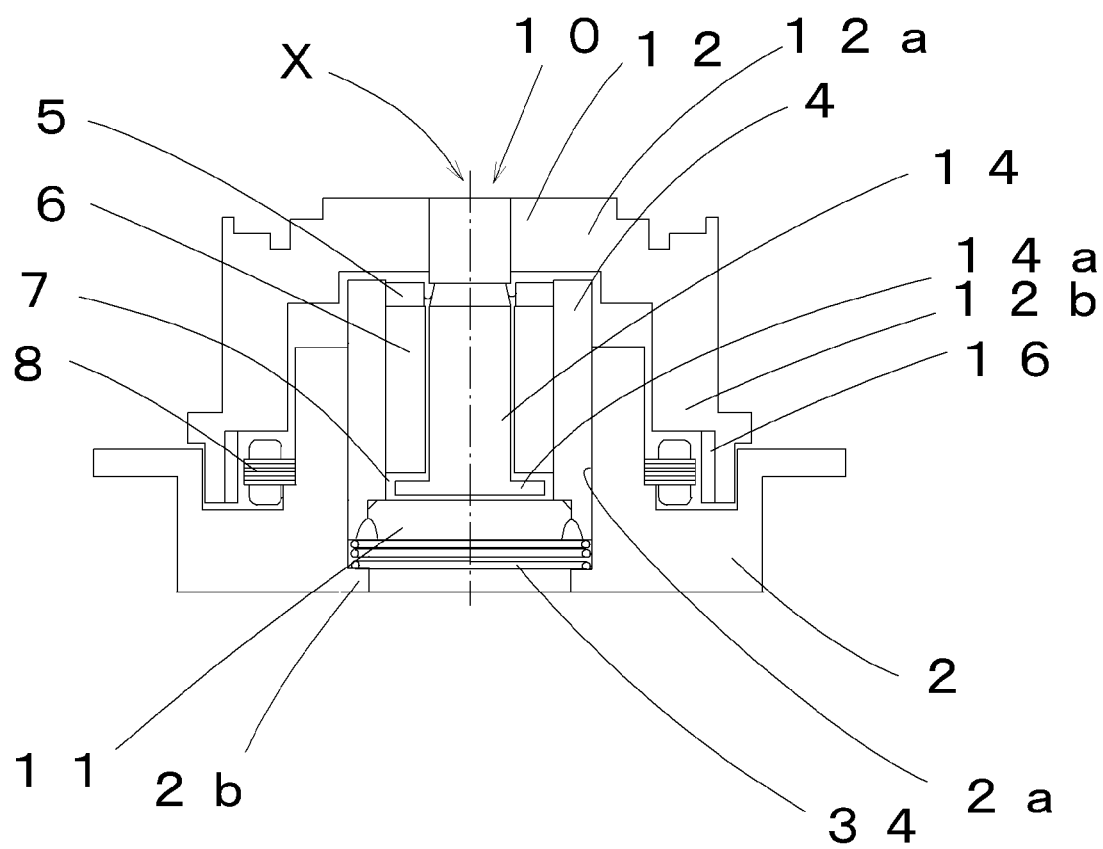
FIG. 1 is a longitudinal sectional view showing a spindle motor according to a first embodiment of the invention.

A spindle motor and a recording disk driving apparatus having the spindle motor according to an embodiment of the invention are explained below with reference to FIGS. 1 to 8. In the description of the embodiments that follows, the vertical direction in the drawings is defined as "vertical direction" for the convenience of explanation and does not limit the directions in actual mounting positions.

FIRST EMBODIMENT

Structure of Spindle Motor

The first embodiment of the invention is explained with reference to FIG. 1. FIG. 1 is a longitudinal sectional view of the spindle motor used with, for example, a hard disk driving apparatus. This spindle motor includes a substantially cup-shaped bracket 2, a housing 4 inserted in a circular through hole 2a at the central portion of the bracket 2 and a sleeve 6 fitted on the inner peripheral surface of the housing 4.

The housing 4 is a hollow cylindrical member and constitutes an integrated structure by coupling a closing plate 11 by laser welding to the lower end of the housing 4. By seal welding the closing plate 11, oil 7 in the housing 4 can be held not to leak out. The inner peripheral surface of the sleeve 6 is in opposed relation to a rotor 10 in radial direction with a minuscule gap therebetween. The lower end surface of the sleeve 6 is in axially opposed relation to the upper surface of a shaft flange 14a arranged at the lower end of the rotor 10 with a minuscule gap therebetween, while the upper surface of the closing plate 11 is in axially (vertically in FIG. 1) opposed relation to the lower surface of the shaft flange 14a with a minuscule gap therebetween. A seal member 5 is mounted at the upper end of the sleeve 6, and a tapered minuscule gap is set with the rotor 10 thereby to constitute a capillary seal portion for preventing the scattering and leakage of the oil 7. The bracket 2 is formed separately from the base (numeral 51 in FIG. 8) of the recording disk driving apparatus according to the invention. Nevertheless, the invention is not limited to this configuration, and the bracket 2 and the base 51 may be integrally formed with each other.

The rotor 10 includes a shaft 14 and a rotor hub 12 fixed on the shaft 14. The shaft 14 is adapted to rotate around the rotary axis X with respect to the sleeve 6. The rotor hub 12 has a substantially disk-shaped upper wall portion 12a and a peripheral wall portion 12b suspended from the outer periphery of the upper wall portion 12a.

A rotor magnet 16 is fixed by adhesive on the inner peripheral surface of the peripheral wall portion 12b, and the rotor magnet 16 is in radially opposed relation to a stator 8 through a gap therebetween. Also, a recording disk (numeral 53 in FIG. 8) is arranged on the outer peripheral side surface of the peripheral wall portion 12b.

In this structure, the gap between the rotor 10 and the seal member 5, the gap between the inner peripheral surface of the sleeve 6 and the outer peripheral surface of the shaft 14, the gap between the lower end surface of the sleeve 6 and the upper end surface of the shaft flange 14a and the gap between the lower end surface of the shaft flange 14a and the upper surface of the closing plate 11 all communicate with each other. This continuous gap holds the oil 7 as a lubricating fluid without any interruption.

Fluid Dynamic Bearing

Due to the effect of the dynamic pressure generating groove formed on the inner peripheral surface of the sleeve 6, the upper radial dynamic bearing 20 and the lower radial dynamic bearing 22 are arranged in spaced relation to each other in the axial direction with the outer peripheral surface of the shaft 14.

Due to the effect of the dynamic pressure generated with the rotation, the rotor 10 is stably rotated and held by the upper radial dynamic bearing 20 and the lower radial dynamic bearing 22.

Also, the lower end surface of the sleeve 6 having the dynamic pressure groove is in opposed relation to the upper surface of the shaft flange 11a in the axial direction with a minuscule gap therebetween, and so is the lower surface of the shaft flange 11a to the closing plate 11 having the dynamic pressure groove, thereby forming thrust dynamic bearings 24, 25.

With the rotation of the rotor 10, the internal pressure of the oil is increased by the dynamic pressure effect, and the rotor 10 is thus stably held afloat.

Conductive Member 34

The conductive member 34 is a member like a coil spring arranged to secure the conduction between the housing 4 and the bracket 2. The conductive member 34 is arranged in contact, while being elastically compressed in the axial direction along the rotary axis X, between the lower end surface of the housing 4 and an L-shaped flange 2b having a smaller inner diameter than the insertion portion of a circular through hole 2a forming an inward protrusion from the inner wall of the circular through hole 2a at the central portion of the bracket 2. The conductive member 34 is fabricated of a conductive material typically such as stainless steel or aluminum alloy having an appropriate strength and rigidity.

Operation of Conductive Member 34

Next, a method of mounting the conductive member 34 on the bracket 2 and the housing 4 is explained. First, the closing plate 11 is seal welded to the housing 4 into a cup-shaped form by laser welding. Then, the shaft 14 is held at a predetermined position in the cup by a jig (not shown), while the sleeve 6 is fixedly bonded under pressure on the housing 4 so that the gap between the closing plate 11 and the lower end surface of the sleeve 6 has a predetermined amount. Next, the seal member 5 fixedly bonded on the inside of the sleeve 4 in such a manner as to come into contact with the upper end surface of the sleeve 6. The oil 7 is injected under vacuum into the inner gap of these assemblies. At the same time, the stator 8 is pressure fitted in the bracket 2. The conductive member 34 is arranged on the L-shaped flange 2b on the bracket 2, after which the adhesive 9 is coated on the inside of the upper portion of the circular through hole 2a of the bracket 2. The assembly is inserted into the circular through hole 2a, and while the conductive member 34 is elastically deformed to a predetermined degree, the adhesive 9 is hardened and fixedly held. Further, the rotor hub 12 having the rotor magnet 16 mounted thereon is fixedly mounted on the upper protrusion of the shaft 14 thereby producing the state shown in FIG. 1.

With this configuration, the conductive member 34 firmly engages the housing 4 and the bracket 2 while holding the elastic stress, and therefore an electrical conduction path can always be maintained.

The static electricity generated in the recording disk 53 with the rotation of the rotor 10 is transmitted from the rotor 10 to the sleeve 6 and the housing 4 through the oil 7 filled in the housing 4. The static electricity is transmitted from the lower end surface of the housing 4 to the conductive member 34, and further to the bracket 2 through the flange 2b. Thus, a satisfactory conduction can be secured between the rotor 10 and the bracket 2, and the conduction failure such as the accumulation of the static electricity in the spindle motor is positively prevented.

In the fluid dynamic bearing rotated at high speed in a minuscule bearing gap or the hard disk driving apparatus for reading/writing the record through a minuscule gap, generation of even a very small particle is required to be avoided. The use of the conductive member 34 within the range of the elastic deformation of the material makes it possible to fabricate a clean spindle motor by suppressing the generation of particles due to the deformation at the time of assembly.

In recent years, the hard disk driving apparatus has begun to be mounted also on the on-vehicle devices typically including the car navigation system. The on-vehicle devices, however, are expected to be used in various environments, and therefore, for the devices used for this, it is required to be operated stably over a very wide temperature range. The hard disk driving apparatus, for example, is required to be usable in the more harsh temperature environment than ever before with a temperature difference of 10° C. or more.

Assume that the conductive adhesive is used as in the prior art between the housing 4 and the bracket 2 in such a temperature environment. Due to the difference in coefficient of thermal expansion between the component members as described above, an excessively large thermal stress is generated in the conductive adhesive to cause a cracking or separation, thereby often adversely affecting the conduction between the housing 4 and the bracket 2. According to this embodiment, however, a metal conductive member 34 is interposed between the housing 4 and the bracket 2, and therefore the conduction between the housing 4 and the bracket 2 is positively secured even in the temperature environment described above.

Further, since the conductive member 34 is arranged in contact while being elastically compressed in the axial direction along the rotary axis X, the difference in coefficient of thermal expansion of the component members and the resulting deformation difference in thermal expansion can be absorbed and the contact state is maintained.

In addition, the radial gap with the housing 4 in the through hole 2a of the bracket 2 can be so small as to permit insertion bonding, and therefore the housing 4 is not fixedly bonded by being tilted considerably with respect to the bracket 2 when the conductive member 34 is fixed by compression.

SECOND EMBODIMENT

Next, a second embodiment of the invention is explained with reference to FIG. 2. The motor according to this embodiment has a basic structure equivalent to that of the first embodiment described above. Therefore, showing clearly the correspondence of reference numerals between corresponding component members in the order of 100, only different portions are explained.

Figure 2:
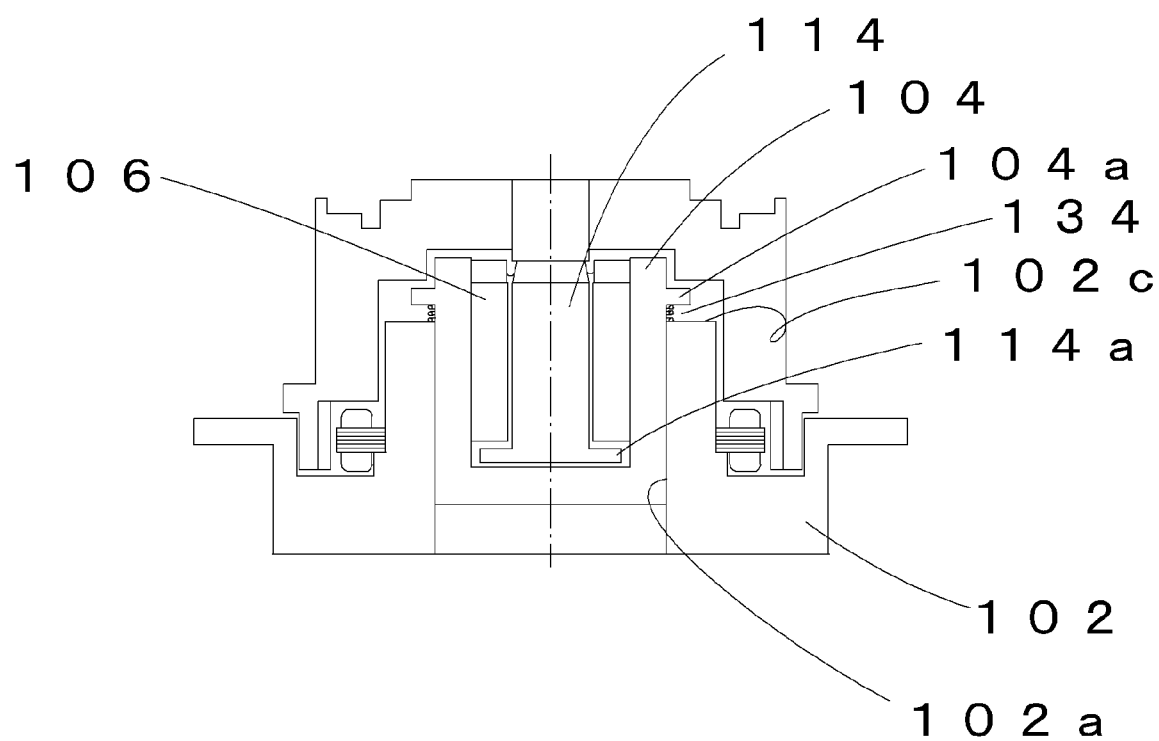
FIG. 2 is a longitudinal sectional view showing a spindle motor according to a second embodiment of the invention.

A housing 104 is fixed in a circular through hole 102 at the central portion of a bracket 102 of the spindle motor shown in FIG. 2. The housing 104 is a substantially cup-shaped bottomed cylindrical member molded by conductive resin, and includes a housing flange 104a constituting a protrusion, on the outer periphery of an opening side, having a larger outer diameter than the inner diameter of the insertion portion of a circular through hole 102a. A sleeve 106 is fixed on the inner peripheral surface of the housing 104. The sleeve 106 is a porous sintered member impregnated with an oil 107. The material of the sleeve 106 is not specifically limited and can be any of various metal powder, metal compound powder or nonmetal powder formed by molding and sintering. The material includes any of Fe—Cu, Cu—Sn, Cu—Sn—Pb and Fe—C. Radial dynamic bearings 120, 121 are formed between the inner peripheral surface of the sleeve 106 and the outer peripheral surface of the shaft 114, and thrust dynamic bearings 124, 125 between the lower end surface of the sleeve, the bottom surface of the housing 104 and the shaft flange 114a.

According to this embodiment, the conductive member 134 like a coil spring is fixed, while being elastically compressed in the axial direction of the rotary axis, between the upper end surface 102c of the bracket constituting the upper end of the circular through hole 102a and the housing flange 104a having a larger outer diameter than the inner diameter of the circular through hole 102a.

The assembly steps and method are substantially the same as those of the first embodiment. In a step of applying the adhesive 9 to the upper inside of the circular through hole 2a of the bracket 2, and inserting the shaft and bearing assemblies into the circular through hole 2a, in the first embodiment, the adhesive is pushed out toward the lower end surface of the housing, and the adhesive thus pushed out makes its way into the gap with the conductive member 34 with the result that the contact between the housing 4 and the conductive member 34 is hampered often leading to a conduction failure. According to this embodiment, in contrast, the conductive member 134 is arranged at the upper end of the circular through hole 102a, and therefore the adhesive is prevented from overflowing at the time of insertion and the contact is positively secured.

Also, according to this embodiment, the housing 104 is made of resin and the bracket 102 of metal, between which the difference of coefficient of thermal expansion is considerably large. At a low temperature, therefore, the housing 104 and the adhesive 109 are considerably shrunk and a larger thermal tensile stress is generated in the insertion portion, often causing the cracking or separation of the adhesive 109.

Generally, the adhesive cannot be easily attached to resin and a sufficient bonding strength cannot be obtained. Application of a vibration stress, etc. causes the cracking or separation more easily than in the bonding between metals. The use of the method according to this embodiment which assures conduction makes it possible to fabricate a reliable motor.

The second embodiment can produce similar operational effects to those of the other first embodiment described above. Also, an inexpensive spindle motor can be fabricated by molding the housing 104 with a conductive resin and the sleeve 106 with a porous sintered material.

THIRD EMBODIMENT

Figure 3:
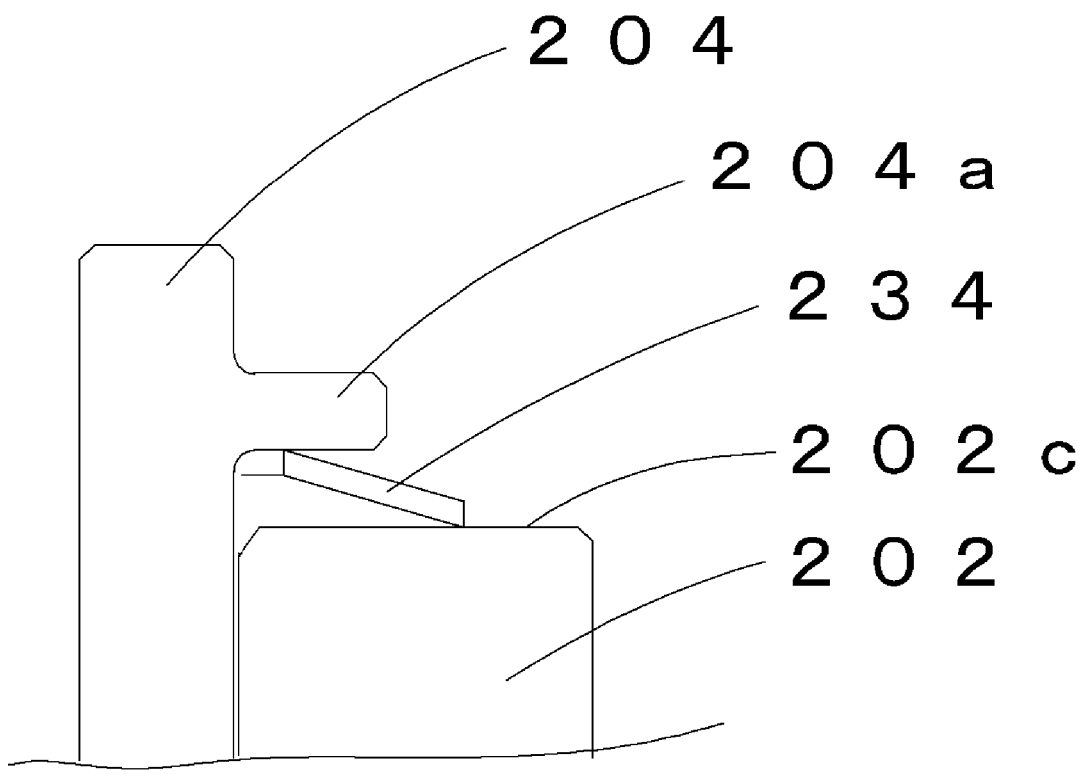
FIG. 3 is a diagram showing the mounted state of the conductive member according to a third embodiment of the invention.

Next, a third embodiment of the invention is explained with reference to FIG. 3. The motor according to this embodiment has the same basic structure as that of the second embodiment described above, and therefore, showing the correspondence of reference numerals between corresponding component members in the order of 200, only different portions are explained.

According to this embodiment, a conductive member 234 arranged between an upper end surface 202c of the bracket constituting the upper end of a circular through hole 202a and a housing flange 204a protruded outward of a housing 204 is in the shape of disk spring. The conductive member, however, is not limited to this shape and any members having a predetermined strength, rigidity and conductivity in the shape of peripherally corrugated spring or annular member having the cross section in the shape of "O", "C" or "U", for example, may be employed with equal effect.

The third embodiment can produce the similar operational effects to the first and second embodiments.

FOURTH EMBODIMENT

Figure 4:
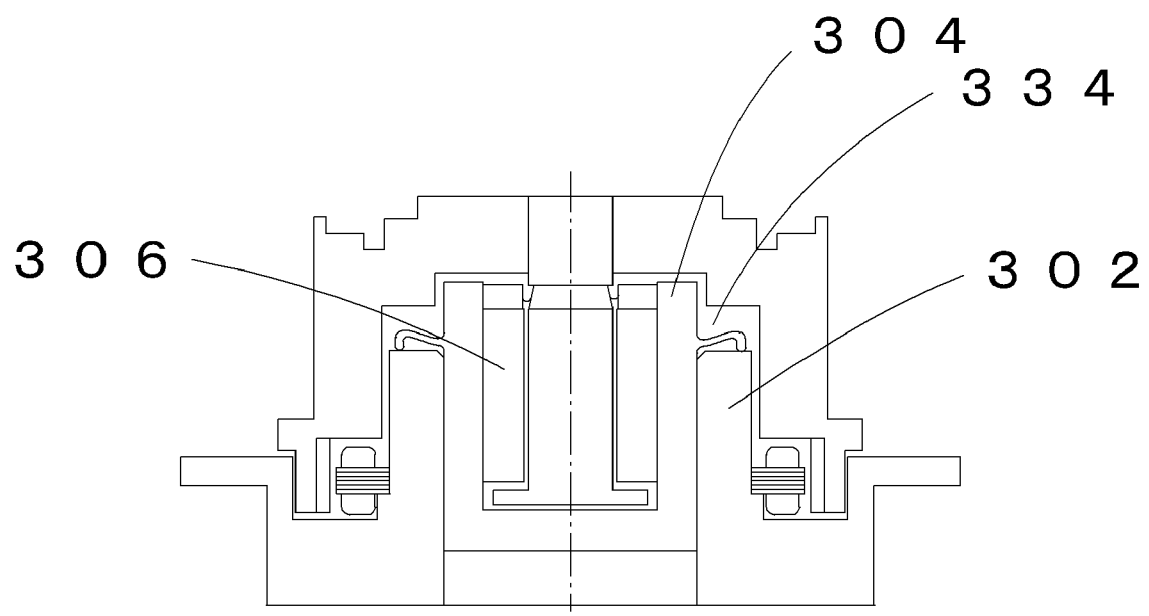
FIG. 4 is a longitudinal sectional view showing a spindle motor according to a fourth embodiment of the invention.

Next, a fourth embodiment of the invention is explained with reference to FIG. 4. The motor according to this embodiment has the same basic structure as that of the second embodiment, and therefore, showing the correspondence of reference numerals between corresponding component members in the order of 300, only different portions are explained.

According to this embodiment, a conductive member 334 has a thin flange structure expanding like a flange from the outer periphery of a housing 304 and integrated with the housing 304.

In this structure, the housing 304 and the conductive member 334 are integrally molded by injection molding using a conductive resin mixed with a conductive metal whisker, which reduces the number of parts leading to a lower cost.

FIFTH EMBODIMENT

Figure 5:
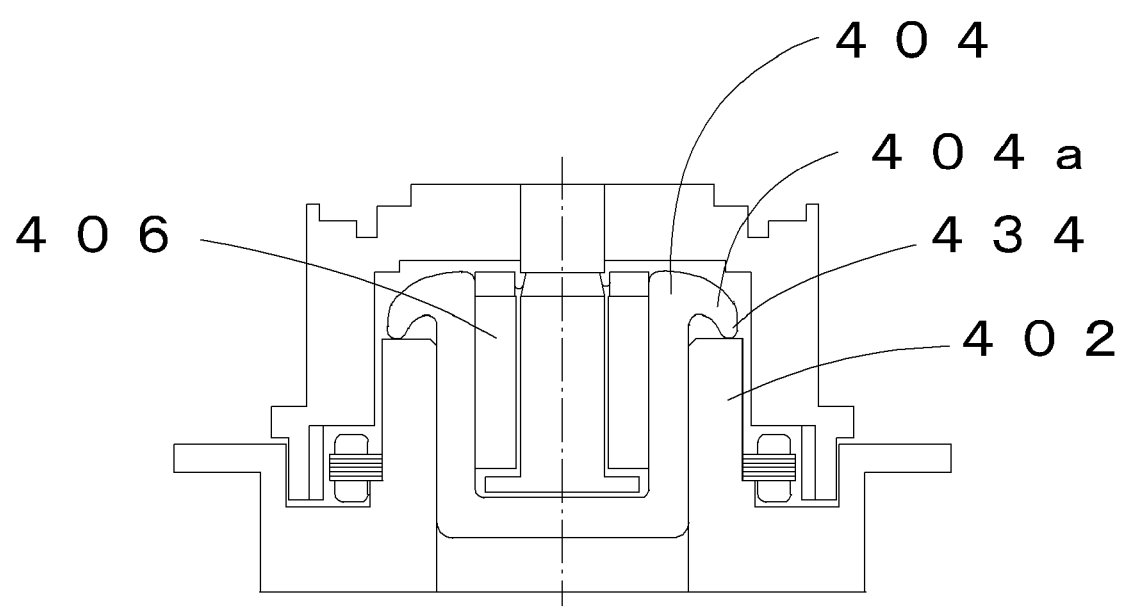
FIG. 5 is a longitudinal sectional view showing a spindle motor according to a fifth embodiment of the invention.

Next, a fifth embodiment of the invention is explained with reference to FIG. 5. The motor according to this embodiment has the same basic structure as that of the second embodiment, and therefore, showing the correspondence of reference numerals between corresponding component members in the order of 400, only different portions are explained.

According to this embodiment, a conductive member 434 is configured by coating an anticorrosive metal film 434a on a protrusion 404b formed on the lower surface of a housing flange 404a protruded from the outer periphery of a housing 404. The housing 404 is fabricated by press forming of a plate member of copper material. In view of the fact that the flatness of the housing flange 404a is difficult to secure, however, the housing flange 404a is tapered by being tilted downward more than a predetermined value and compressed to come into contact with an upper surface 402c of the bracket positively at several or more peripheral points of the peripheral direction. Further, at the particular contact points, the anticorrosive metal film 434a is coated on the surface thereby to prevent the rusting and secure conduction.

SIXTH EMBODIMENT

Figure 6:
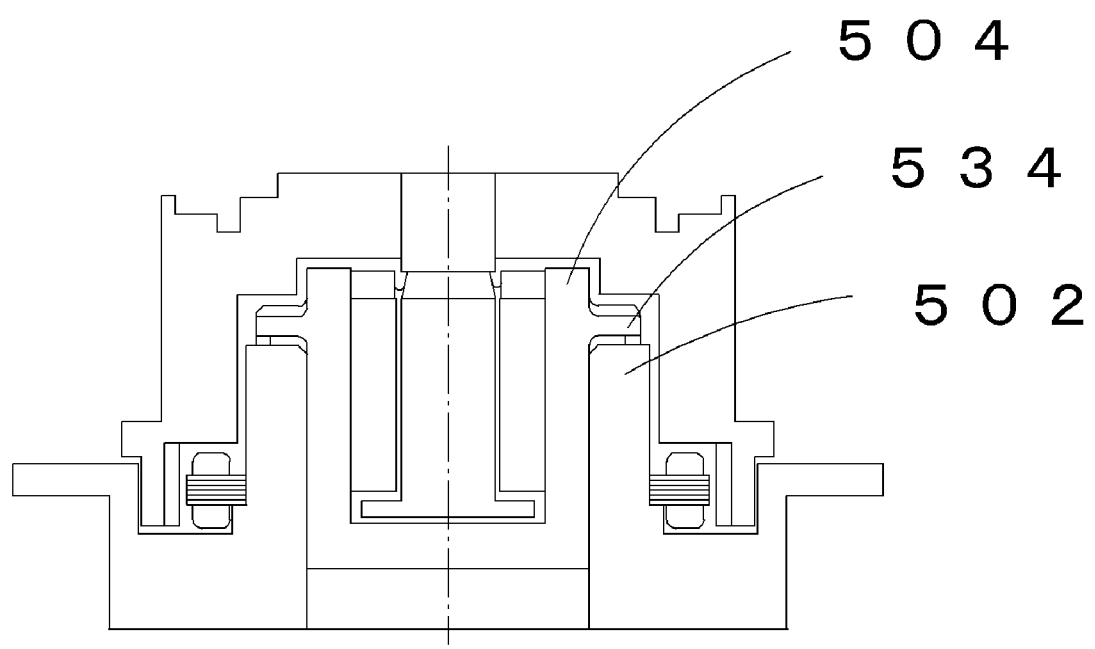
FIG. 6 is a longitudinal sectional view showing a spindle motor according to a sixth embodiment of the invention.
Figure 7:
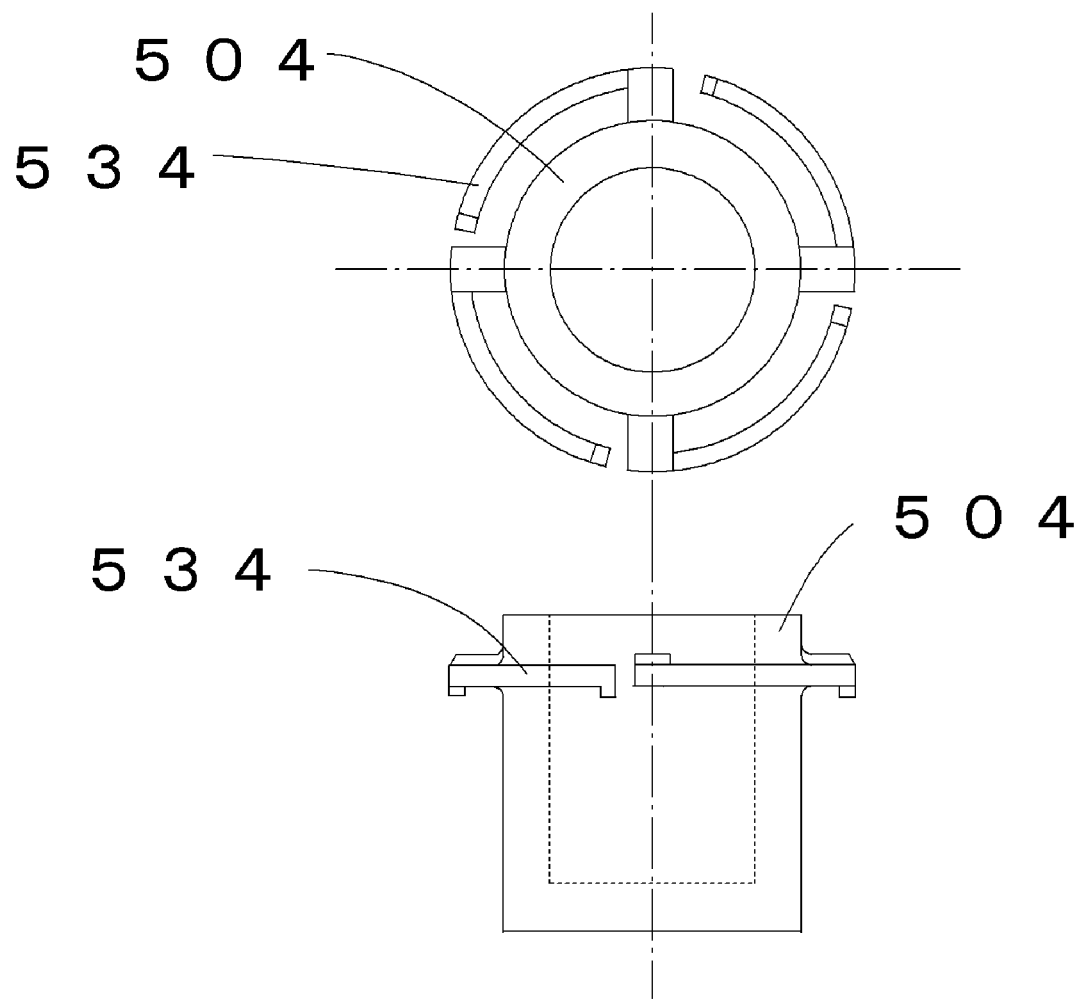
FIG. 7 is a diagram showing units of the housing and the conductive member according to the sixth embodiment of the invention.
Figure 8:
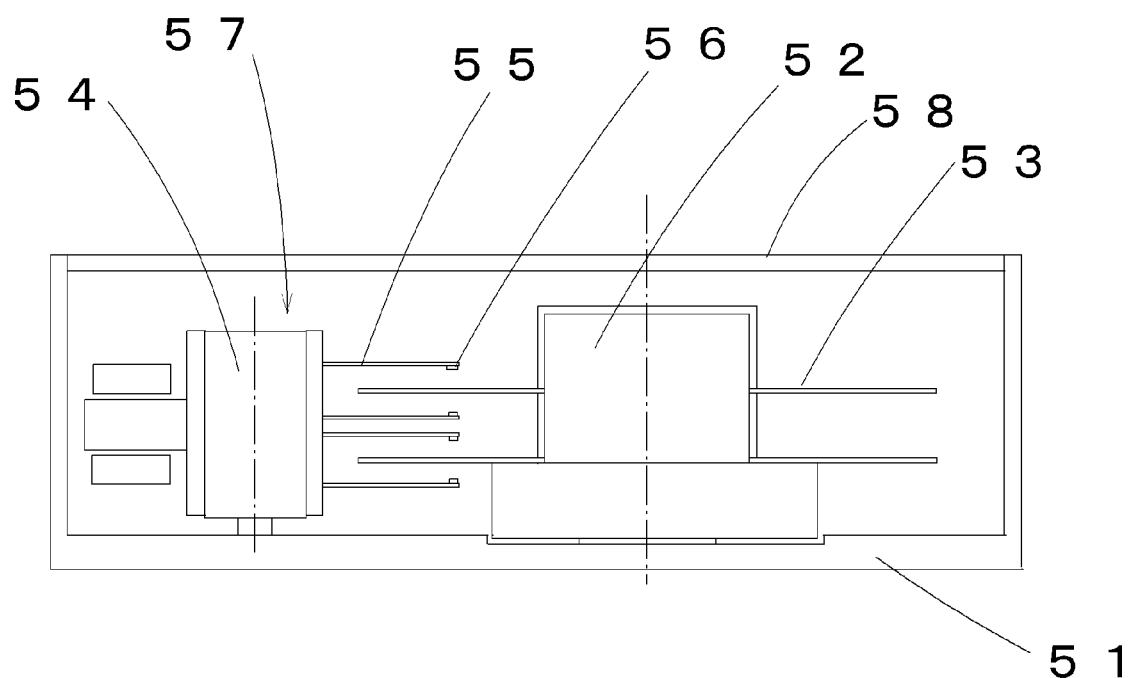
FIG. 8 is a longitudinal sectional view showing a recording disk driving apparatus according to the invention.

Next, a sixth embodiment of the invention is explained with reference to FIGS. 6, 7. The motor according to this embodiment has the same basic structure as that of the second embodiment, and therefore, showing the correspondence of reference numerals between corresponding component members in the order of 500, only different portions are explained.

According to this embodiment, a conductive member 534 is integrated with a housing 504 and in the shape of an arcuate bar along the outer periphery of the housing 504 extending from four outward protrusions of the housing 504. With this structure, an appropriate rigidity can be selected without increasing the number of parts. FIG. 7 shows the housing 504 and the conductive member 534 proper according to the sixth embodiment.

Recording Disk Driving Apparatus

Next, the internal configuration of a recording disk driving apparatus 50 is explained with reference to FIG. 7. The interior of bases 51, 58 forms a clean space substantially free of dust and dirt, and has arranged therein a spindle motor 52 with a recording disk 53 such as a hard disk for storing information. Further, a head moving mechanism 57 for reading/writing information from/into the recording disk 53 is arranged inside the bases 51, 58. This head moving mechanism 57 is configured of a head 56 for reading/writing information on the recording disk 53, an arm 55 for supporting the head 56, and an actuator 54 for moving the head 56 and the arm 55 to a required position on the recording disk 53.

A spindle motor shown in any one of FIGS. 1 to 6 is used as the spindle motor 52 of this recording disk driving apparatus 50. Thus, regardless of the temperature environment in which the recording disk driving apparatus is used, the static electricity can be released always stably out of the spindle motor. In this way, a reliable, durable recording disk driving apparatus is provided.

The spindle motor and the recording disk driving apparatus having the spindle motor according to an embodiment of the invention are described above. This invention, however, is not limited to this embodiment and can be variously modified or altered without departing from the scope thereof.

For example, this embodiment represents a bearing type having only one gas-liquid boundary under which the thrust bearings are concentrated. As an alternative, the thrust bearings may be arranged both above and below or a plurality of gas-liquid boundaries may be formed. Also, the dynamic pressure groove may be spiral, herringbone-shaped, arcuate or in any other shape. Further, instead of the oil used as the fluid of the fluid dynamic bearing, the same operational effects of the invention can be obtained by alternatively using air for the motor as what is called the air dynamic bearing with equal effect.

Also, unlike in this embodiment using a motor of outer rotor type with a stator arranged radially inward of the rotor magnet, what is called the motor of inner rotor type in which the stator is arranged radially outward of the rotor magnet is also applicable in the invention.

What is claimed is:

1. A spindle motor wherein a shaft and a sleeve rotate relatively to each other around a rotary axis, the motor comprising:

a bracket having a circular through hole extending in the axial direction of the rotary axis;

a housing having a cylindrical portion inserted into the circular through hole;

a cylindrical sleeve fitted on the inner peripheral surface of the housing;

a shaft inserted at least along a part of the inner peripheral surface of the sleeve;

a fluid dynamic bearing formed at least between the outer peripheral surface of the shaft and the inner peripheral surface of the sleeve;

a protrusion outward or inward of an inner wall of the insert portion of the circular through hole on at least one of the bracket and the housing; and a conductive member arranged in contact in the axial direction of the rotary axis at least between the protrusion and one of the bracket or the housing, thereby electrically connecting between the protrusion and one of the bracket or the housing; wherein the conductive member is in contact under the elastic stress applied thereto.

2. A spindle motor according to claim 1, wherein:

at least one of the bracket and the housing is formed of a conductive resin; and the bracket and the housing are coupled to each other with adhesive in the circular through hole.

3. A spindle motor according to claim 2, wherein the housing is formed of a resin molded product in a shape of a bottomed cylinder.

4. A spindle motor according to claim 3, wherein:

an outward protrusion extending from the inner wall of the insert portion of the circular through hole is formed on the outer periphery of the housing; and the conductive member is arranged in contact with and between the bracket and the protrusion in the axial direction of the rotary axis to electrically connect the bracket and the protrusion to each other.

5. A spindle motor according to claim 4, wherein:

the conductive member is formed with an elastic portion elastically deformed toward and in contact with at least one of the bracket and the housing; and the conductive member is in contact with and between the protrusion and at least one of the bracket or the housing with an elastic stress due to an elasticity of the elastic portion.

6. A spindle motor according to claim 5, wherein:

a rotor hub having a substantially disc shape upper wall portion and a peripheral wall portion suspended from the outer periphery of the upper wall portion is mounted at one end of the shaft, and constitutes a rotor rotating around the rotary axis integrally with the shaft; and the conductive member is arranged in the circular through hole on the side thereof nearer to the upper wall portion of the rotor hub in the axial direction than the insert portion of the bracket and the housing in the circular through hole.

7. A spindle motor according to claim 6, wherein the conductive member has a structure integrated with the protrusion and/or the housing and/or the bracket.

8. A spindle motor according to claim 7, wherein:

the bracket includes a stator with a coil;

the shaft supports the rotor having a rotor magnet in opposed relation to the stator; and a circuit board electrically connected with the coil is mounted on a flat surface of the bracket.

9. A recording disk driving apparatus comprising:

a base;

the spindle motor of claim 8, fixed on a ceiling side or a bottom side of the base;

a recording disk fixed on the outer periphery of the rotor of the spindle motor for reading/writing information; and an information access unit for writing/reading information at a required position of the recording disk.

10. A spindle motor according to claim 6, wherein:

the bracket includes a stator having a coil;

the rotor having a rotor magnet in opposed relation to the stator is supported on the shaft; and a circuit board electrically connected with the coil is mounted on a flat surface of the bracket.

11. A recording disk driving apparatus comprising:

a base;

the spindle motor of claim 10, fixed on a ceiling side or a bottom side of the base;

a recording disk fixed on the outer periphery of the rotor of the spindle motor for reading/writing information; and an information access unit for writing/reading information at a required position of the recording disk.

12. A spindle motor according to claim 1, wherein:

a protrusion outward of the inner wall of the insert portion of the circular through hole is formed on the outer periphery of the housing; and the conductive member is arranged in contact with and between the bracket and the protrusion in the axial direction of the rotary axis to electrically connect the bracket and the protrusion to each other.

13. A spindle motor according to claim 12, wherein:

the conductive member is formed with an elastic portion elastically deformed toward and in contact with at least one of the bracket and the housing; and the conductive member is in contact with the protrusion and at least one of the bracket or the housing with an elastic stress due to an elasticity of the elastic portion.

14. A spindle motor according to claim 13, wherein:

a rotor hub having a substantially disc shape upper wall portion and a peripheral wall portion suspended from an outer periphery of the upper wall portion is mounted at one end of the shaft, and constitutes a rotor rotating around the rotary axis integrally with the shaft; and the conductive member is arranged in the circular through hole on the side thereof nearer to the upper wall portion of the rotor hub in the axial direction than the insert portion of the bracket and the housing.

15. A spindle motor according to claim 14, wherein the conductive member has a structure integrated with the protrusion and/or the housing and/or the bracket.

16. A spindle motor according to claim 15, wherein:

the bracket includes a stator with a coil;

the shaft supports the rotor having a rotor magnet in opposed relation to the stator; and a circuit board electrically connected with the coil is mounted on a flat surface of the bracket.

17. A recording disk driving apparatus comprising:

a base;

the spindle motor of claim 16, fixed on a ceiling side or a bottom side of the base;

a recording disk fixed on the outer periphery of the rotor of the spindle motor for reading/writing information; and an information access unit for writing/reading information at a required position of the recording disk.

18. A spindle motor according to claim 14, wherein:

the bracket includes a stator with a coil;

the shaft supports the rotor having a rotor magnet in opposed relation to the stator; and a circuit board electrically connected with the coil is mounted on a flat surface of the bracket.

19. A recording disk driving apparatus comprising:

a base;

the spindle motor of claim 18, fixed on a ceiling side or a bottom side of the base;

a recording disk fixed on the outer periphery of the rotor of the spindle motor for reading/writing information; and an information access unit for writing/reading information at a required position of the recording disk.

* * * * *